United States Patent [19]
Walter

[11] 4,247,174
[45] Jan. 27, 1981

[54] LIQUID CRYSTAL CELL

[75] Inventor: Karl-Heinz Walter, Grafing, Fed. Rep. of Germany

[73] Assignee: Siemens Aktiengesellschaft, Berlin & Munich, Fed. Rep. of Germany

[21] Appl. No.: 44,058

[22] Filed: May 31, 1979

[30] Foreign Application Priority Data

Jun. 6, 1978 [DE] Fed. Rep. of Germany ....... 2824798

[51] Int. Cl.³ ............................................. G02F 1/133
[52] U.S. Cl. ..................................... 350/340; 350/341; 350/347 E
[58] Field of Search ..................... 350/340, 341, 347 E

[56] References Cited

U.S. PATENT DOCUMENTS

| | | | |
|---|---|---|---|
| 4,002,404 | 1/1977 | Dir .................................... | 350/340 |
| 4,038,439 | 7/1977 | Gibson et al. ................... | 350/341 X |
| 4,128,313 | 12/1978 | Cole et al. ......................... | 350/340 |

*Primary Examiner*—Edward S. Bauer
*Attorney, Agent, or Firm*—Hill, Van Santen, Steadman, Chiara & Simpson

[57] ABSTRACT

A liquid crystal cell, which has two carrier plates spaced apart to form a cavity for receiving a liquid crystal layer, the plates on a surface facing the liquid crystal layer being provided with electrodes so that a portion of the liquid crystal layer is switchable between different operating states, is characterized by an improvement consisting of providing at least one of the facing surfaces of the carrier plates with means for orienting strip-like zones of the liquid crystal layer adjacent the surface with different orientations, each of the strip-like zones having a width of approximately 5 μm and the striplike zones being alternately substantially homogeneously oriented and substantially homeotropically oriented. One embodiment of forming the cell is to provide parallel strips of orienting material with adjacent strips being of different types of orienting material. These strips may be applied directly on a flat surface of the carrier plate or the carrier plate may be mechanically shaped to have a waveshaped cross section or profile with the flanks of the various wave-shaped crests being treated with different orienting material. In utilizing the device, the application of an electrical field may be used to increase or decrease the size of the oriented strip-shaped zone and the zone may be used in a multiplex-type display.

20 Claims, 3 Drawing Figures

LIQUID CRYSTAL CELL

BACKGROUND OF THE INVENTION

The present invention is directed to a liquid crystal cell with two carrier plates, which enclose between them a liquid crystal layer which can be switched by areas between optically different states with the liquid crystal layer having different oriented strip-like zones at least in a switchable area at least adjacent one of the two parallel boundary surfaces for the cell and methods of operating the device as well as methods for producing the device.

An article by Rupert Chabicovsky and Gerhard Kocmann, "Liquid-Crystal Cells With Special Electrodes For The Generation Of Uniform Colors By Optical Birefringence", *IEEE Transactions on Electron Devices*, Vol. ED 24, No. 7, July 1977, pp 807–810 discoses a liquid crystal cell, which had been treated in a special way so that all of the homeotropic molecules are pretilted in the same desirable direction. To accomplish this pretilting, the surface of the carrier plate forming the layer has been provided with a wave-shaped profile and one or more of the flanks of the crest of the profile are treated to orient the molecules of the layer in a different manner so that the coaction between the orientations causes the desired tilting. While the profile surface may have strips on the flanks of the crest which are different orientation materials, these materials are selected so that the entire layer is tilted in the same direction at the same angle.

In standard liquid crystal displays, the turn-on time $t_1$ depends on the electrical field E with $t_1$ being approximately equal to $1/E^2$ and the turn-off time $t_2$, which is normally longer, will depend on the thickness d of the liquid crystal layer with $t_2$ being approximately equal to $d^2$. Because of this interrelationship, attempts have now been made to shorten the switching time of a liquid crystal cell primarily by reducing the spacing between the carrier plates. This solution for shortening the switching times has not been too satisfactory. Because the substrates are never entirely flat and seldom inherently stable, there is an increasing tendency of short circuits and due to the unavoidable interval support tolerances, liquid crystal layers with fixed thickness of approximately 5 $\mu$m can only be realized and produced with the greatest care and the smallest thickness value appears to be approximately 3 $\mu$m.

Another attempt to improve the switching behavior of a liquid crystal cell is by use of electrode systems in which interdigital electrodes are provided so that fields can be applied parallel to the layer surface. Discussions of these types of systems are contained in an article by D. J. Channin, "Triode Optical Gate: A New Liquid Crystal Electro-Optic Device", Applied Physics Letter, Vol. 26, No. 11, June 1, 1975, pp. 603–605. Since the liquid crystal now no longer relaxes into its initial position but rather is rotated back by means of the application of electrical field, the turn-off times can indeed be reduced. However, the minimum interval between neighboring electrodes of an interdigital electrode structure, which can be attained with a standard photoetching technique, is approximately 50 $\mu$m so that the "triode" concept requires high switching voltages and can only be minimally employed in multiplexable displays.

SUMMARY OF THE INVENTION

The present invention is directed to providing an extremely quick switching of liquid crystal displays which provision posses no particular manufacturing problems, is flash-over resistant and can also be operated without a turn-off voltage. To accomplish this task, the invention is directed to an improvement in a liquid crystal cell having two carrier plates spaced apart to form a cavity for receiving the liquid crystal layer, said plates on a surface facing the liquid crystal layer being provided with electrodes so that portions of the liquid crystal layer are switchable between different optical states. The improvements comprise means provide on at least one of the facing surfaces for orienting strip-like zones of the liquid crystal layer adjacent the surface with a different orientation, said strip-like zones having a width of at the most 5 $\mu$m with said strip-like zones being alternately substantially homogeneously oriented and substantially homotropically oriented. In the present connection, substantially homogeneous and substantially homeotropic means that the texture of the liquid crystal molecules are not aligned strictly parallel as in homogeneous or strictly perpendicular as in homeotropic to the plane of the surface of the carrier plate but, rather also tilted with respect to these ideal positions. Allowable deviations from substantially parallel or perpendicular are $\pm 15°$ and preferably only $\pm 10°$. Thus, the liquid crystal molecules of the substantially homogeneous oriented zones will have an angle of incidence at the boundary surface with respect to the surface of the carrier plate which at most is 15° and preferably is no greater than 10° and the liquid crystal molecules of the substantially homeotropic oriented zone adjacent the boundary surface will have an angle of incidence with respect to said surface of at least 75° and preferably at least 80°.

In the proposed liquid crystals, the strip-like zones in the liquid crystal layer adjacent the substrate surface will have a width of approximately 4 $\mu$m and preferably at the most 2 $\mu$m with all of the zones having substantially the same width. Given such dimensions for the zones, the liquid crystal layer will be uniformly oriented at a distance from the surface having the means for orienting. This uniform direction of orientation for the molecules will be either plate perpendicular or plate parallel as desired.

The proposed solution proceeds from the following observations. If the boundary surface of the liquid crystal layer has zones that are alternately textured in the proposed manner, this boundary surface alignment induces a periodic orientation pattern with strong, elastic deformations in the interior of the liquid crystal. What is decisive is that this pattern is relatively quickly lost at an increasing distance from the boundary surface of the liquid crystal layer and after a distance of one or more widths of the strip-like zones from the surface of the carrier plate, the liquid crystal layer will reassume its uniform orientation so that the applied voltages only reorient in the more or less strongly predeformed boundary surface zones having the strip-like zones of orientation. This is, above all, true when the liquid crystal molecules in the depth of the layer lie precisely parallel or, respectively, perpendicular to the plane of the substrate and in this situation, the electrical field change the thickness of the predeformed strip-like zones adjacent the boundary surface.

In the proposed display, only a thin boundary layer is optically effective. Accordingly, the turn-off time is significantly shorter than in the cell type with an equally thick, however, uniformly aligned liquid crystal layer. The optical effect corresponds either to a DAP or, respectively, a Freedricks cell and depends upon whether the liquid crystal layer is textured homeotropically or homogeneously in the interior which is no longer periodically deformed by the coaction between the strip-like zones adjacent the carrier plate.

The means for orienting the strip-like zone can be strips of orienting material. The process of producing the liquid crystal cell includes providing the carrier plate and forming the means for orienting the strip-like zones on the surface of the carrier plate. A particularly expedient technology for creating the means for orienting consist in generating the orientation strips by means of shaping a surface of the structure which surface may be either the surface of the carrier plate or a layer on the carrier plate to have a wave-shaped profile having crests with each crest having a pair of flanks. The flank of each crest may orient homogeneously or, respectively, hometropically. The flanks may be treated with orienting material in various combinations. For example, if the surface is of one type of orienting material, then only one flank of each crest need be provided with the other orienting material. Another embodiment is to coat the entire crest with one type of orienting material and then coat one flank of each crest with a different orienting material or a third possibility is to coat one flank of each crest with one type of orienting material and coat the other flank of each crest with a second type of orienting material. The different techniques mentioned hereinabove are described in the above mentioned article by Chabicovsky et al. To coat the single flank is done by utilizing an oblique coating or depositing technique. After applying the coating to the various flanks, the entire profiled surface can be leveled through a heat treatment process so that the crest will flow with their orienting material back into a flat-like surface.

Instead of forming the strip-like area by utilizing a profiled surface, the strip-like areas may be applied by applying strips of two different orienting materials on the surface of the carrier plate. One method of forming the two strips is to apply a continuous layer of a first type of orienting material on a surface of the substrate, subdividing the continuous layer into spaced, parallel strips by applying a pattern of strip-like mask and subsequently etching the exposed portions of the layer, applying a continuous layer of a second material, applying a masking pattern on the second layer and etching to form spaced apart parallel strips of the second material which are interposed between the parallel strips of the first material and then subsequently removing all the remaining masking patterns. Another embodiment of the method for applying the strips is to apply a masking pattern on the surface of a carrier plate, which masking pattern leaves spaced parallel exposed strips of the surface of the carrier plate, applying strips of a first orienting material on the exposed strips of the surface of the carrier plate, removing the mask to expose strips of the surface of the carrier plate between the parallel strips of the first material, forming a mask to cover the strips of the first material, applying a coating of the second material on the exposed strips of the surface and subsequently removing the second covering mask.

DESCRIPTION OF THE PREFERRED EMBODIMENTS

Figure 1:
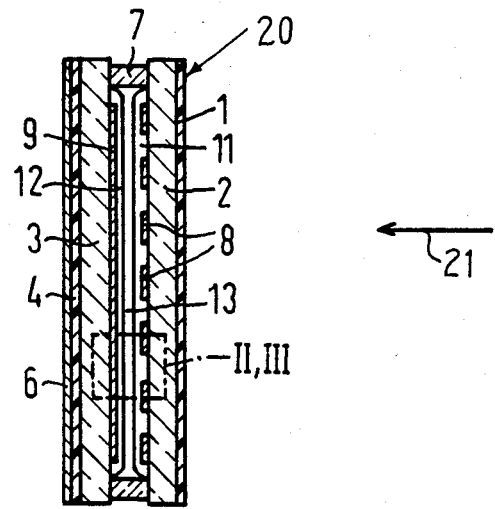
FIG. 1 is a cross section of a liquid crystal display cell in accordance with the present system.

The principles of the present invention are particularly useful in a liquid crystal cell generally indicated at 20 in FIG. 1. The liquid crystal cell 20 may be a so-called DAP cell wherein DAP means deformation of aligned phases. In detail, the liquid crystal cell 20 in FIG. 1 taken in the direction of viewing indicated by arrow 21 comprises a front linear polarizer 1 disposed on the outer surface of a front carrier plate 2, a back carrier plate 3 having a back linear polarizer 4 disposed on an outer surface and covered by a reflector or reflecting layer 6. The linear polarizers 2 and 4 have their directions of polarization arranged at right angles to each other. The two carrier plates 2 and 3 are spaced apart and sealed together by a frame 7 to form a cavity 13 for receiving a liquid crystal layer. The plates 2 and 3 on their respective surface which face the layer are provided with electrodes with the plate 2 having electrodes 8, which are illustrated as line electrodes, and the plate 3 being provided with electrodes 9 which are also strip-like electrodes arranged as "column" electrodes extending at right angles to the electrodes 8. Each of the electrodes 8 and 9 are covered by layers 11 and 12, respectively, which provide orientation for the adjacent liquid crystal molecules.

Figure 2:
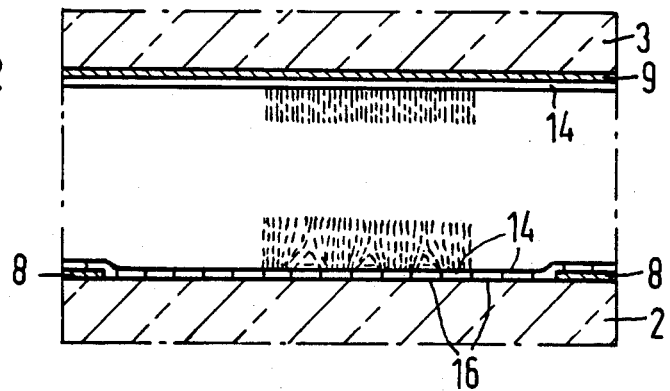
FIG. 2 is an enlarged cross section enclosed in broken lines in the area indicated as II in FIG. 1.
Figure 3:
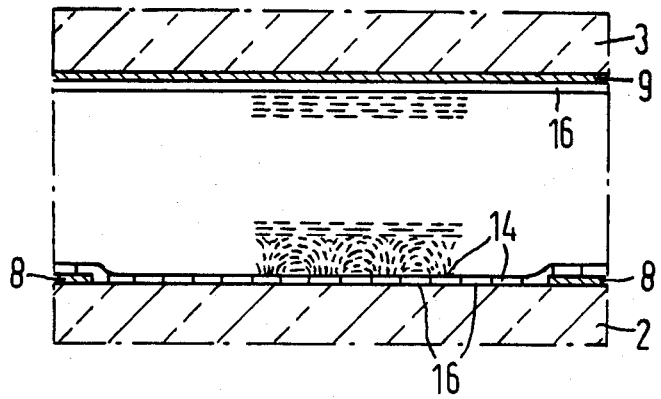
FIG. 3 is a second sample embodiment similar to FIG. 2 taken in the area of III of FIG. 1.

As best illustrated in FIGS. 2 and 3, each of the coatings or layers 11 and 12 are formed of a plurality of spaced, parallel strips with the strips 14 of a first orienting material being spaced apart by the strips 16 which are of a second orienting material which is of a different type of orienting material than the strips 14. In the illustrated embodiments of FIGS. 2 and 3, the strips have a width of approximately 2 μm and the direction or longitudinal axis of the liquid crystal molecules are indicated by means of strokes. Thus, each of the strips 14 are of a material which causes substantially homeotropic orientation of the molecules while the strips 16 are of a material that causes a substantial homogeneous orientation. The alternating strip-like zones in the liquid crystal layer adjacent the strips 14 and 16 are thus alternately deformed in different orientations with the strong elastic tensions between adjacent strip zones of the liquid crystal cell gradually weakening as the effects of the orienting material on the strip-like zones decreases with an increasing distance from the strips 14 and 16. Thus, as the perpendicular distance from the strips 14 and 16 increases, the effects of the orientation material decreases until the liquid crystal assumes a uniform orientation which is illustrated in FIG. 2 as a homeotropic and in FIG. 3 as a homogeneous texture. These uniform homogeneous or, respectively, homeotropic textures will occur at a distance of approximately 2-4 μm when the width of the orienting strips 14 and 16 have the width of 2 μm.

In the embodiment illustrated in the figures, both the carrier plates 2 and 3 are provided with orientation layers having an identical structure. However, the longitudinal extending strips 14 and 16 on the plate 2 extend perpendicular to the direction of the strips 14 and 16 of the plate 3. This type of arrangement is recommended in a DAP display since contrast of color depend on the viewing angle of the plate plane and these fluctuations are at least partially compensated by means of the two strip patterns lying perpendicular to one another.

The orientation state recorded in FIG. 2 can be generated when the liquid crystal layer has a dielectric constant with a positive anisotropy of $\Delta\epsilon > 0$ and the E field is directed perpendicular to the substrate plane. When the liquid crystal molecules have a negative anisotropy of $\Delta\epsilon < 0$ and the E field proceeds parallel to the plate plane, this same orientation can be accomplished. The texture illustrated in FIG. 3 is produced when given a liquid crystal layer having a $\Delta\epsilon < 0$ the plate parallel field is applied or, respectively, when the liquid crystal molecule has a $\Delta\epsilon < 0$ a plate-perpendicular field prevails.

The orientation layers having the strips 14 and 16 can be easily manufactured with known steps. For example, one of the materials may be deposited as either a continuous layer on the surface such as by vacuum metallization and then subdivided into the parallel, spaced strips 14 by applying a mask and etching, then the material forming the strips 16 is applied, masked and etched to form the parallel, spaced strips 16. In addition, the material such as used in the strips 14 can be applied by masking the surface and leaving exposed portions where the strips 14 are to be provided, providing the material 14, removing the mask to expose the surface where the strips 16 are subsequently to be applied, providing a mask to cover the strips 14 and applying the material 16 and subsequently removing the mask covering the strips 14.

Another method of forming the strips such as 14 and 16 is to provide a profiled surface such as mechanically profiling by either rubbing or grinding either the surface of the carrier plate or self-covering layer disposed on the surface of the carrier plate to provide a wave-like profile. Then subsequently depositing material, such as by oblique vacuum depositing, on one flank of each crest or on both flanks of each crest which crests were caused by the mechanical profiling. Subsequent to applying the material to the crest, the grooves and crest can be then leveled by means of a temperature treatment, if desired. With this type of process, the desired orientation patterns can be realized with a particularly fine grid spacing. Thus, one can achieve periods or width of approximately 1 $\mu$m without further problems. As mentioned hereinabove, the orienting material may be applied to only one flank by obliquely applying with the second orienting material being the material of the surface or the profile surface may be coated by a direct depositing with one type of orienting material and then a flank covered with the secoond orienting material, or one type of material can be obliquely deposited on one flank of each crest and the second orienting material is obliquely deposited in the opposite direction for the other flank of each crest. If one selects the period or width sufficiently small and correctly adapts the rate of different orientations to one another in width and quality, then various surface orientations, for example the texture shown in FIGS. 2 and 3, can be electrically changed over into any other. This effect can thus be employed for storage purposes.

Moreover, if one applies high fields of varying effective directions, for example longitudinal and cross-fields with the voltage of one field being below and one voltage being above a critical frequency at which specific liquid crystal material will change the operational sign of their dielectric anisotropy, one can selectively obtain one of the two orientations for example by making the alternating strips of different widths.

Although various minor modifications may be suggested by those versed in the art, it should be understood that I wish to employ within the scope of the patent granted hereon, all such modifications as reasonably and properly come within the scope of my contribution to the art.

I claim:

1. In a liquid crystal cell having two carrier plates spaced apart to form a cavity for receiving a liquid crystal layer, said plates on a surface facing the liquid crystal layer being provided with electrodes so that portions of the liquid crystal layer are switchable between different optical states, the improvement comprising means provided on at least one of the facing surfaces for orienting strip-like zones of the liquid crystal layer adjacent the surface with a different orientation, said strip-like zones having a width of at the most 5 $\mu$m, with said strip-like zones being alternately substantially homogeneous oriented and substantially homeotropically oriented.

2. In a liquid crystal cell according to claim 1, wherein the liquid crystal molecules of the substantially homogeneous oriented zones have an angle of incidence at the boundary surface with respect to the surface of the carrier plate of at the most 15° and wherein the liquid crystal molecules of the substantially homeotropically oriented zone adjacent the boundary surface have an angle of incidence with respect to said surface of at least 75° and preferably at least 80°.

3. In a liquid crystal cell according to claim 1, wherein the strip-like zones have a width at the most of 4 $\mu$m.

4. In a liquid crystal cell according to claim 1, wherein each of the strip-like zones are at least approximately equal width.

5. In a liquid crystal cell according to claim 1, wherein the liquid crystal layer at a distance from the surface having the means for orienting strip-like zones has a uniformly plate parallel orientation of the molecules.

6. In a liquid crystal cell according to claim 1, wherein the liquid crystal layer at a distance from the surface of the carrier plate having means for orienting has a uniformly plate perpendicular orientation of the molecules.

7. In a liquid crystal cell according to claim 6, wherein each of the carrier plates on a surface facing the liquid crystal layer is provided with means for orienting strip-like zones of different orientations with the direction of the strip-like zones at one surface extending perpendicular to the direction of the strip-like zones adjacent the other surface.

8. In a liquid crystal cell according to claim 1, wherein the means for orienting strip-like zones includes strips of material disposed on the surface of the carrier plate with the strips alternately comprising substantially homogeneously orienting material and substantially homeotropically orienting material.

9. In a liquid crystal cell according to claim 1, wherein the means for orienting strip-like zones comprises the surface having a first surface having a wave-shaped profile, said first surface being selected to be on the surface of the substrate and a surface of a layer disposed on a surface of the substrate, said wave-shaped surface having crests with a pair of flanks for each crest, said crests selectively orienting the adjacent liquid crystal zone substantially homotropically and substantially homeogeneously.

10. In a liquid crystal cell according to claim 9, wherein each of the wave crests has one flank coated with a material selective from a group of orienting materials consisting of substantially homogeneous orienting material and substantially homeotropically orienting material.

11. In a liquid crystal cell according to claim 9, wherein each of the wave crests has both flanks coated with an orienting material with one of said pair of flanks being coated with a substantially homogeneously orienting material and the other flank of the pair being coated with a substantially homeotropically orienting material.

12. A method for producing a liquid crystal cell having a carrier plate provided with electrodes and means provided on at least one of the facing surfaces of the carrier plate for orienting strip-like zones of the liquid crystal layer adjacent the surface, said method comprising providing a carrier plate and forming said means for orienting strip-like zones on a surface of said carrier plate said strip-like zones having a width of at the most 5 μm, with said strip-like zones being alternately substantially homogeneous oriented and substantially homeotropically oriented.

13. A method according to claim 12, wherein said means for orienting comprising alternating parallel strips of two different orienting materials and said method of providing the means for orienting on the surface of the substrate comprises applying a continuous layer of a first orienting material on a surface of the substrate, subdividing the continuous layer into spaced parallel strips by applying a pattern of strip-like mask and etching, applying a continuous layer of a second material, applying a masking pattern on the second layer and etching to form spaced apart parallel strips interposed between the parallel strips of the first material, removing any remaining masking patterns.

14. A method according to claim 12, wherein the means for orienting comprises alternating parallel strips of material disposed on the surface with said adjacent strips being of different orienting materials, wherein said step of providing the means for orienting comprises providing a masking pattern, leaving spaced parallel exposed strips of the surface of the carrier plate, applying strips of a first orienting material on the exposed strips of the surface of the carrier plate, removing the mask to expose strips of the surface of the carrier plate between the parallel spaced strips of the first material, forming a mask to cover the strips of the first material and applying a coating of the second material on the exposed strips of the surface and subsequently removing the second covering mask.

15. A method according to claim 12, wherein the step of forming the means for orienting comprises mechanically shaping the surface of the carrier plate to form a wave-shaped profile having crests, vapor depositing at least one orienting material on selected portions of the profile crests, and subsequently leveling the profile by means of a temperature treatment.

16. A method of operating a liquid crystal cell having two carrier plates spaced apart to form a cavity for receiving the liquid crystal layer, said plates on a surface facing the liquid crystal layer being provided with transparent electrodes and means provided on at least one of the facing surfaces of strip-like zones of the liquid crystal layer adjacent the surface with a different orientation, said strip-like zones having a width at the most of 5 μm with said strip-like zones being alternately substantially homogeneously oriented and substantially homeotropically oriented, said method comprises changing the size of the selected strip-shaped zones of oriented liquid crystal material by applying electrical voltage to selected transparent electrodes.

17. A method according to claim 16, wherein said step of changing changes the thickness of the selected strip-like zones of the liquid crystal layer.

18. A method according to claim 16, wherein a first orientation of the strip-like zones in a liquid crystal layer are created by applying a first electrical voltage to obtain said orientation which remains after switching off the first voltage and said step of changing the size of the orientation comprises applying a second electrical voltage to cancel the first orientation in said zone.

19. A method according to claim 18, wherein the step of applying the first voltage and the step of applying a second voltage creates electrical fields with the electrical field of one of the first and second voltages being perpendicular to the plate plane and the field of the other of said first and second voltages being parallel to the plate plane.

20. A method according to claim 18, wherein the liquid crystal molecules have a critical frequency at which the dielectric anisotropy of the molecule changes its operational sign, and wherein each of said first and second voltages have a different frequency with said critical frequency lying therebetween so the application of one of said first and second voltages causes a change in the operational sign of the dielectric anisotropy of the liquid crystal molecules from the operational sign of the anistropy obtained by the other of said two voltages.

* * * * *